(12) United States Patent
Philibert

(10) Patent No.: US 12,515,421 B2
(45) Date of Patent: Jan. 6, 2026

(54) METHODS AND SYSTEMS FOR FORMING COMPOSITE PARTS

(71) Applicant: The Boeing Company, Arlington, VA (US)

(72) Inventor: Joseph J. Philibert, Salt Lake City, UT (US)

(73) Assignee: The Boeing Company, Arlington, VA (US)

( * ) Notice: Subject to any disclaimer, the term of this patent is extended or adjusted under 35 U.S.C. 154(b) by 144 days.

(21) Appl. No.: 18/477,985

(22) Filed: Sep. 29, 2023

(65) Prior Publication Data

US 2025/0108570 A1   Apr. 3, 2025

(51) Int. Cl.
*B29C 70/44*   (2006.01)
*B29C 70/54*   (2006.01)
*B29K 105/08*   (2006.01)

(52) U.S. Cl.
CPC ............ *B29C 70/44* (2013.01); *B29C 70/544* (2021.05); *B29K 2105/0872* (2013.01)

(58) Field of Classification Search
CPC ....... B29C 70/34; B29C 70/342; B29C 70/44; B29C 70/544; B29C 70/28; B29C 70/30; B32B 37/10; B32B 37/1018; B32B 37/1009
See application file for complete search history.

(56) References Cited

U.S. PATENT DOCUMENTS

| | | | | |
|---|---|---|---|---|
| 5,648,109 A | * | 7/1997 | Gutowski | B30B 5/02 |
| | | | | 425/389 |
| 2005/0253309 A1 | * | 11/2005 | Hou | B29C 35/02 |
| | | | | 264/571 |
| 2010/0310818 A1 | * | 12/2010 | Pridie | B29C 70/541 |
| | | | | 428/114 |

(Continued)

FOREIGN PATENT DOCUMENTS

EP   2200798 B1   1/2019

OTHER PUBLICATIONS

European Patent Office, Extended European Search Report, App. No. 24186293.7 (Nov. 27, 2024).

*Primary Examiner* — Andrew L Swanson
(74) *Attorney, Agent, or Firm* — Walters & Wasylyna LLC

(57) ABSTRACT

A method for forming composite parts includes loading an uncured composite material into a middle cavity of a chamber between an upper membrane and a lower membrane, wherein a lower cavity is defined below the lower membrane, and wherein an upper cavity is defined above the upper membrane, wherein a forming tool is disposed within the upper cavity. A vacuum is applied to the upper cavity, the middle cavity, and the lower cavity to remove at least a portion of gas entrapped within the uncured composite material. The vacuum is released from the upper cavity and the lower cavity, and the chamber is heated to a forming temperature of the uncured composite material. Pressure is (Continued)

controlled in the upper cavity and the lower cavity to form the heated composite material, wherein a greater pressure is applied to the lower cavity than to the upper cavity such that a pressure differential between the lower cavity and the upper cavity causes the heated composite material to form around the forming tool. The chamber is heated to a curing temperature to cure the heated composite material.

20 Claims, 15 Drawing Sheets

(56) References Cited

U.S. PATENT DOCUMENTS

| | | |
|---|---|---|
| 2014/0175709 A1* | 6/2014 | Blackburn .............. B29B 11/16 |
| | | 264/554 |
| 2017/0087782 A1 | 3/2017 | Kline et al. |
| 2017/0106607 A1* | 4/2017 | Anderson ............. B29C 70/342 |
| 2019/0016063 A1* | 1/2019 | Newton ................ B29C 70/205 |
| 2021/0023799 A1* | 1/2021 | Santoni ................... B29C 51/10 |
| 2021/0299975 A1* | 9/2021 | Wybrow ................ B32B 27/12 |
| 2022/0118720 A1 | 4/2022 | Modin et al. |
| 2022/0143935 A1* | 5/2022 | Yui ......................... B29C 43/12 |
| 2022/0281184 A1* | 9/2022 | Belcher ................ B29C 35/041 |
| 2024/0083122 A1* | 3/2024 | Santoni ................... B29C 51/10 |
| 2024/0416600 A1* | 12/2024 | Perrillat-Collomb ....................... |
| | | B29C 43/12 |

\* cited by examiner

METHODS AND SYSTEMS FOR FORMING COMPOSITE PARTS

FIELD

The present application relates to the field of composite materials, specifically to methods and systems for forming and curing composite materials.

BACKGROUND

Composite materials, composed of two or more distinct materials, have found widespread applications in various industries such as aerospace, automotive, and construction. These materials combine the strengths of individual components, like high strength-to-weight ratio, corrosion resistance, and durability. However, manufacturing composite parts often involves complex processes that require careful control of multiple parameters like temperature, pressure, and curing time. Traditional methods often involve steps such as laying up layers of fiber-reinforced resin, vacuum bagging, and curing in an autoclave. These processes are time-consuming, labor-intensive, and present challenges with respect to ensure a consistent and defect free final product. Entrapped gases, for instance, can cause voids in the material. As a result, there is a continuing need for improved methods and systems that can produce high-quality composite parts more efficiently and consistently.

Accordingly, those skilled in the art continue with research and development in the field of composite materials, aiming to develop methods and systems that can optimize the forming and curing processes, and result in composite parts with enhanced properties and performance.

SUMMARY

In one embodiment, there is a method for forming composite parts, the method comprising the steps of: loading an uncured composite material into a middle cavity of a chamber between an upper membrane and a lower membrane, wherein a lower cavity is defined below the lower membrane, and wherein an upper cavity is defined above the upper membrane, wherein a forming tool is disposed within the upper cavity; applying a vacuum to the upper cavity, the middle cavity, and the lower cavity to remove at least a portion of gas entrapped within the uncured composite material; releasing the vacuum from the upper cavity and the lower cavity; heating the chamber to a forming temperature of the uncured composite material to yield a heated composite material; controlling pressure in the upper cavity and the lower cavity to form the heated composite material, wherein a greater pressure is applied to the lower cavity than to the upper cavity such that a pressure differential between the lower cavity and the upper cavity causes the heated composite material to form around the forming tool; and heating the chamber to a curing temperature to cure the heated composite material, thereby yielding a cured composite material.

In another embodiment, there is a system for forming composite parts, the system comprising: a housing defining a chamber, the housing including a loading access into the chamber; an upper membrane disposed within the chamber, an upper cavity defined above the upper membrane; a lower membrane disposed within the chamber under the upper membrane, wherein a middle cavity is defined between the upper membrane and the lower membrane, and wherein a lower cavity is defined below the lower membrane, wherein the loading access is in communication with the middle cavity; a first vacuum port in communication with the upper cavity; a second vacuum port in communication with the middle cavity; a third vacuum port in communication with the lower cavity; a first pressure control valve in communication with the upper cavity; a second pressure control valve in communication with the lower cavity; and a forming tool disposed within the upper cavity.

In another embodiment, there is a method for forming composite parts, the method comprising: loading an uncured composite material comprising multiple plies of fiber-reinforced resin into a chamber between an upper membrane and a lower membrane; heating the chamber to a forming temperature of the uncured composite material to yield a heated composite material; forming the heated composite material by controlling pressure in the chamber to press the upper and lower membranes against the heated composite material; and heating the chamber to a curing temperature to cure the formed composite material, thereby yielding a cured composite material.

Other embodiments of the disclosed methods and systems will become apparent from the following detailed description, the accompanying drawings and the appended claims.

DETAILED DESCRIPTION

This description provides a detailed outline of a method and system for forming composite parts. Although the method can be implemented using various systems, this description also discloses a specific system designed to implement the process. However, it's important to note that using this specific system is not mandatory to implement the method; any system that meets the required criteria can be used to execute the method detailed herein.

Figure 1:
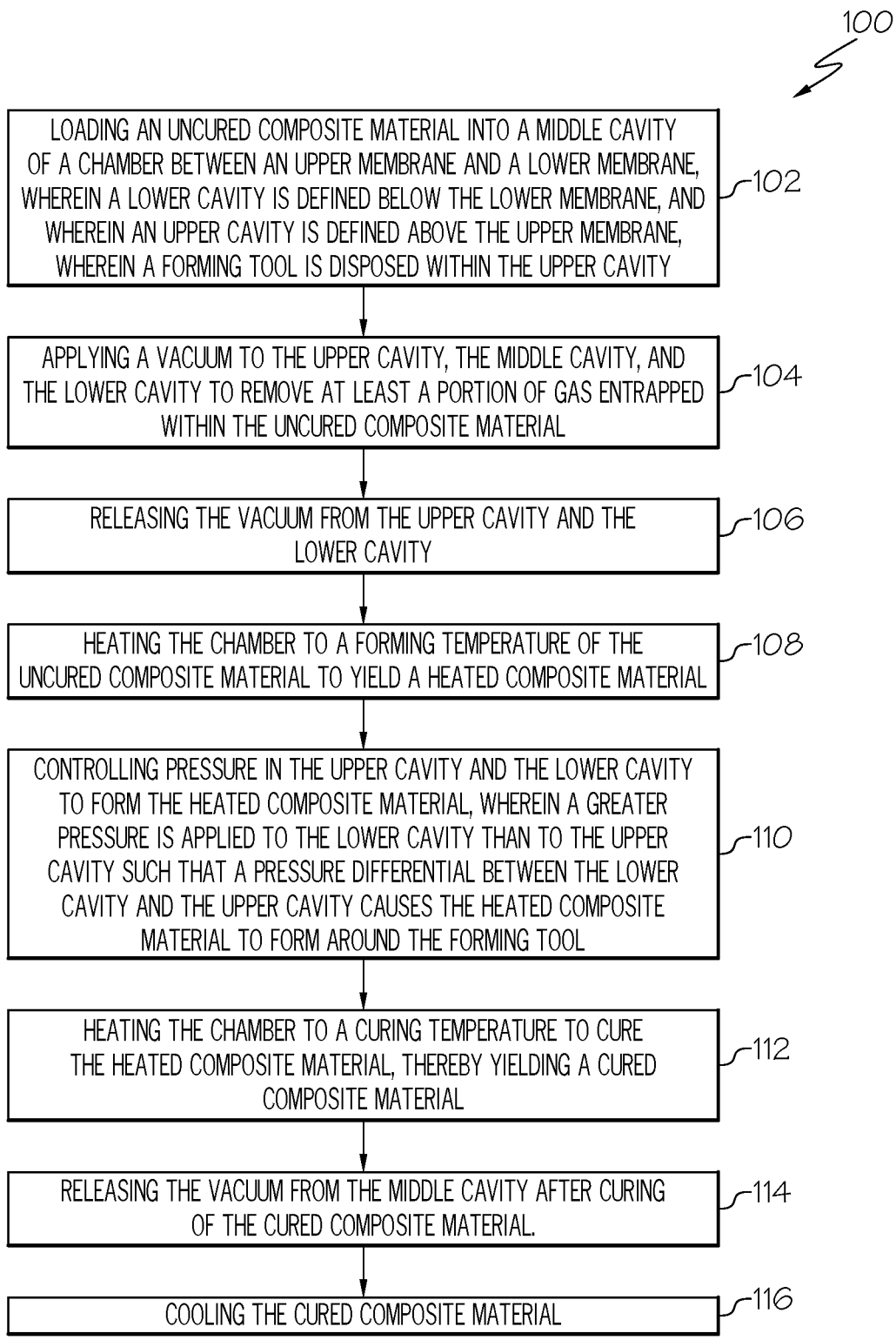
FIG. 1 illustrates a flowchart of an exemplary method of the present description for forming composite parts including loading an uncured composite material into a chamber, applying and releasing a vacuum, heating and pressurizing the material to form and cure it, and cooling the cured material. The pressure in the cavities and the vacuum in the middle cavity are manipulated at different stages to aid in the formation and curing of the material.

FIG. 1 illustrates a flow diagram of a method, designated as (100), for forming composite parts according to an exemplary aspect of the present description. At step (102), an uncured composite material is loaded into a middle cavity of a chamber between an upper membrane and a lower membrane, wherein a lower cavity is defined below the lower membrane, and wherein an upper cavity is defined above the upper membrane, wherein a forming tool is disposed within the upper cavity. At step (104), a vacuum is applied to the upper cavity, the middle cavity, and the lower cavity to remove at least a portion of gas entrapped within the uncured composite material. At step (106), the vacuum is released from the upper cavity and the lower cavity. At step (108), the chamber is heated to a forming temperature of the uncured composite material to yield a heated composite material. At step (110), pressure is controlled in the upper cavity and the lower cavity to form the heated composite material, wherein a greater pressure is applied to the lower cavity than to the upper cavity such that a pressure differential between the lower cavity and the upper cavity causes the heated composite material to form around the forming tool. At step (112), the chamber is heated to a curing temperature to cure the heated composite material, thereby yielding a cured composite material. At step (114), the vacuum is released from the middle cavity after curing of the cured composite material. At step (116), the cured composite material is cooled.

Regarding step (102), this step involves loading the uncured composite material into the middle cavity of the chamber, between the upper and lower membranes. The forming tool is also disposed within the upper cavity before or during step (102). At step (102), the method commences with the loading of an uncured composite material into the middle cavity of the chamber. This middle cavity is positioned between two membranes: the upper and the lower one. To facilitate this loading process, there might be specific loading access integrated into the housing. To assist in the loading, a vacuum could be applied to both the upper and lower cavities to retract the upper and lower membranes.

The uncured composite material could be chosen from a wide variety of composite materials available in the market. In one particular aspect, the uncured composite material could be a fiber-reinforced resin, which offers advantages such as increased strength and flexibility, reduced weight, and improved resistance to external environmental factors. In yet another aspect, the uncured composite material could be structured as multi-layered, incorporating several plies of the said fiber-reinforced resin, granting advantages such as enhanced structural integrity and better load distribution across the composite material. Additionally, the method of the present description has particular advantages when applied to multi-layered composite materials. Particularly, the method of the present description can reduce or avoid interply friction during forming by not compacting the composite material prior to forming.

Regarding step (104), the application of vacuum to the upper, middle, and lower cavities is a step in the process that removes entrapped gases within the uncured composite material. These gases can originate from various sources such as the initial mixing of the components of the composite material, air entrapped between the layers of multi-layered composite materials, or simply from the surrounding environment. When the composite material is heated and pressurized, these entrapped gases can form voids or inclusions within the material, which are areas where the material is not continuous. The presence of voids or inclusions can also affect the mechanical, thermal, electrical properties of the material. By applying a vacuum to the cavities, the pressure within the cavities is reduced, which assists in drawing out the entrapped gases from the uncured composite material.

The application of vacuum can occur in stages, such as initially the upper and lower cavities, followed by the middle cavity. Accordingly, prior to starting the process of removing entrapped gases from within the uncured composite material, the upper and lower membranes can be pulled away from the uncured composite material. By pulling the upper and lower membranes away from the uncured composite material, contact between the uncured composite material and the upper and lower membranes can be minimized. After the upper and lower cavities have been evacuated of air, the vacuum can then be applied to the middle cavity containing the uncured composite material. The removal of air from the middle cavity facilitates the expulsion of entrapped gases from within the uncured composite material. By minimizing contact between the uncured composite material and the upper and lower membranes, the surface area directly exposed to the vacuum can be increased, and removal of gases from the uncured composite material can be improved. This contrasts with the traditional vacuum bag de-gassing in which the vacuum bag typically largely contacts the uncured composite material during the de-gassing process. This improvement in de-gassing is significant to prevent the formation of voids and inclusions throughout the uncured composite material.

Furthermore, by minimizing or avoiding contact between the uncured composite material and the upper and lower membranes, this can avoid undesirable compression of the composite material during the forming process applied by the membranes during de-gassing. The compression aspect is significant when considering the integrity of an uncured composite material during the vacuum application process. Composite materials, when uncured, have a particular structure made up of fibers and a resin matrix. This structure is vulnerable to external forces. If pressure is applied unevenly or inappropriately, the alignment of fibers or alignment of layers can be disturbed, or the distribution of the resin can become uneven. Furthermore, applying vacuum to the upper cavity further pulls the forming tool away from applying pressure to the uncured composite. This is necessary because, if the forming tool was applying pressure to the uncured composite, it could compress the composite material during the de-gassing process. This compression could squeeze out the resin or misalign the fibers, leading to defects in the final cured product.

During the vacuum application, it's advantageous to maintain a distance between the forming tool and upper membrane and the uncured composite material. By distancing the forming tool and the upper and lower membranes from the composite material when applying the vacuum, the potential for this unintended compression is reduced. This distance also allows for a more uniform de-gassing process. Also, as the vacuum process progresses, this spacing allows for real-time adjustments, ensuring the uncured composite material remains undisturbed and retains its original structural properties.

Regarding step (106), the vacuum is released from the upper and lower cavities. This step prepares the chamber for the subsequent heating process and adjusts the pressure in the cavities for the forming process. The release of the vacuum can occur in stages, preferably first from the upper cavity and then from the lower cavity. Releasing the vacuum from the upper cavity causes the upper membrane to drop and provide support to the uncured composite material. Additionally, releasing the vacuum from the upper cavity causes the forming tool to drop and press against the uncured composite material. Releasing the vacuum from the lower cavity causes the lower membrane to start pushing the uncured composite material towards the forming tool and the upper membrane. Releasing the vacuum from the lower cavity is important for forming. Releasing the vacuum from the upper cavity before the lower cavity is advantageous to ensure support of the uncured composite material and to avoid premature forming. However, it is possible to simultaneously release the vacuum from the upper and lower cavities or to release the vacuum from the lower cavity before releasing the vacuum from the upper cavity.

Regarding step (108), the chamber is heated to the forming temperature of the uncured composite material. As the chamber heats up, the uncured composite transitions into a heated state. This is done to reach the forming temperature of the composite material, which typically ranges between 45° C. and 200° C. This heating process makes the composite material pliable and ready for shaping. The chamber may be heated before, during, or after the vacuum release from the upper and lower cavities.

Regarding step (110), the pressure in the upper and lower cavities is controlled to shape the heated composite material. The design of the method indicates that the lower cavity experiences a higher pressure than the upper one. A greater pressure is applied to the lower cavity than to the upper cavity, creating a pressure differential that causes the heated composite material to form around the forming tool. This step ensures that the material conforms to the desired shape. In an aspect, the pressure difference, when combined with the positioning of the heated composite between the two membranes, can lead to the composite adopting an S-shaped deformation. This deformation is facilitated as the composite gets pushed upwards, molding itself around the forming tool present in the upper cavity. The pressure disparity between the cavities can vary, usually falling between 1 psi and 100 psi.

Regarding step (112), the chamber is further heated to the curing temperature to cure the heated composite material. The chamber's temperature is increased to a curing level, which can usually range from 100° C. to 250° C. Heating to the curing temperature range functions to solidify the composite material and set its final shape. Monitoring the temperature during this step can ensure that the composite material cures without being damaged by excessive heat. The method involves maintaining the same vacuum level in the middle cavity that was set during the initial vacuuming and forming stages. Additionally, during this curing phase, both the upper and lower cavities may be pressurized to a specified curing pressure. Curing pressure is the pressure applied to the composite material during the curing process to ensure the material compacts correctly. This pressure helps in achieving a uniform and void-free final product. Once the composite material is appropriately cured, the resulting product is a fully cured composite material with optimized mechanical properties and structural integrity.

Regarding step (114), the vacuum is released from the middle cavity after the curing process is complete. This helps to equalize the pressure in the chamber and prepares the cured composite material for removal of the formed and cured composite material from the chamber.

Regarding step (116), the cured composite material is cooled down to a temperature that is safe for handling and further processing. This step can avoid the development of internal stresses or cracks in the final product. The cooling process can be performed gradually, either by shutting off the heating source and allowing the chamber to cool naturally or by actively cooling the chamber using a controlled cooling system. The rate of cooling should may be controlled carefully to avoid inducing thermal stresses in the composite material. Once the material has cooled down to a safe handling temperature, it can be removed from the chamber for further processing or inspection.

The method (100) may include additional intermediate steps such as pre-treating the uncured composite material before loading it into the chamber, which could involve applying a release agent, adhesive, or any other surface treatment necessary for the specific composite material being used. Another step could involve adjusting the position of the forming tool or the composite material during the forming process, which may be ensure uniform contact and pressure distribution, particularly for complex shapes. Additionally, monitoring the temperature and pressure during the heating and curing processes can achieve the desired properties of the final part, which could involve using sensors placed inside the chamber or embedded within the composite material. Lastly, a post-curing treatment can be applied to the cured composite material before cooling. This treatment could involve applying additional heat, pressure, or chemical treatments to the cured composite material to optimize its properties. These intermediate steps can be incorporated as needed, depending on the specific requirements of the composite material and the desired final properties of the formed part.

The method (100) may include additional steps after cooling the cured composite material. For example, the final part may be trimmed or machined to achieve the final dimensions or surface finish. Additionally, the formed and cured composite material may undergo non-destructive testing methods, such as ultrasonic testing or X-ray inspection, to ensure that there are no defects, such as voids or delaminations, in the final part. Moreover, the final part may be subjected to a surface treatment, such as coating, to achieve desired protective properties. The formed part may also be assembled with other components to create a larger structure or assembly.

The following description is directed towards a system (2) for forming composite parts and its utilization in the method described above. The system, as illustrated and detailed herein, is designed to facilitate the introduction, de-gassing, formation, curing and removal of composite materials within a controlled environment. This environment is maintained within a chamber that is segmented by membranes into different cavities, each having distinct pressure controls. The arrangement of the chamber, membranes, vacuum ports, and other components, facilitates optimal conditions for the forming and curing of composite materials. The following description of the system provides an overview of the system, its components, their functions, and their cooperation to execute the above-identified method effectively and efficiently.

Figure 2:
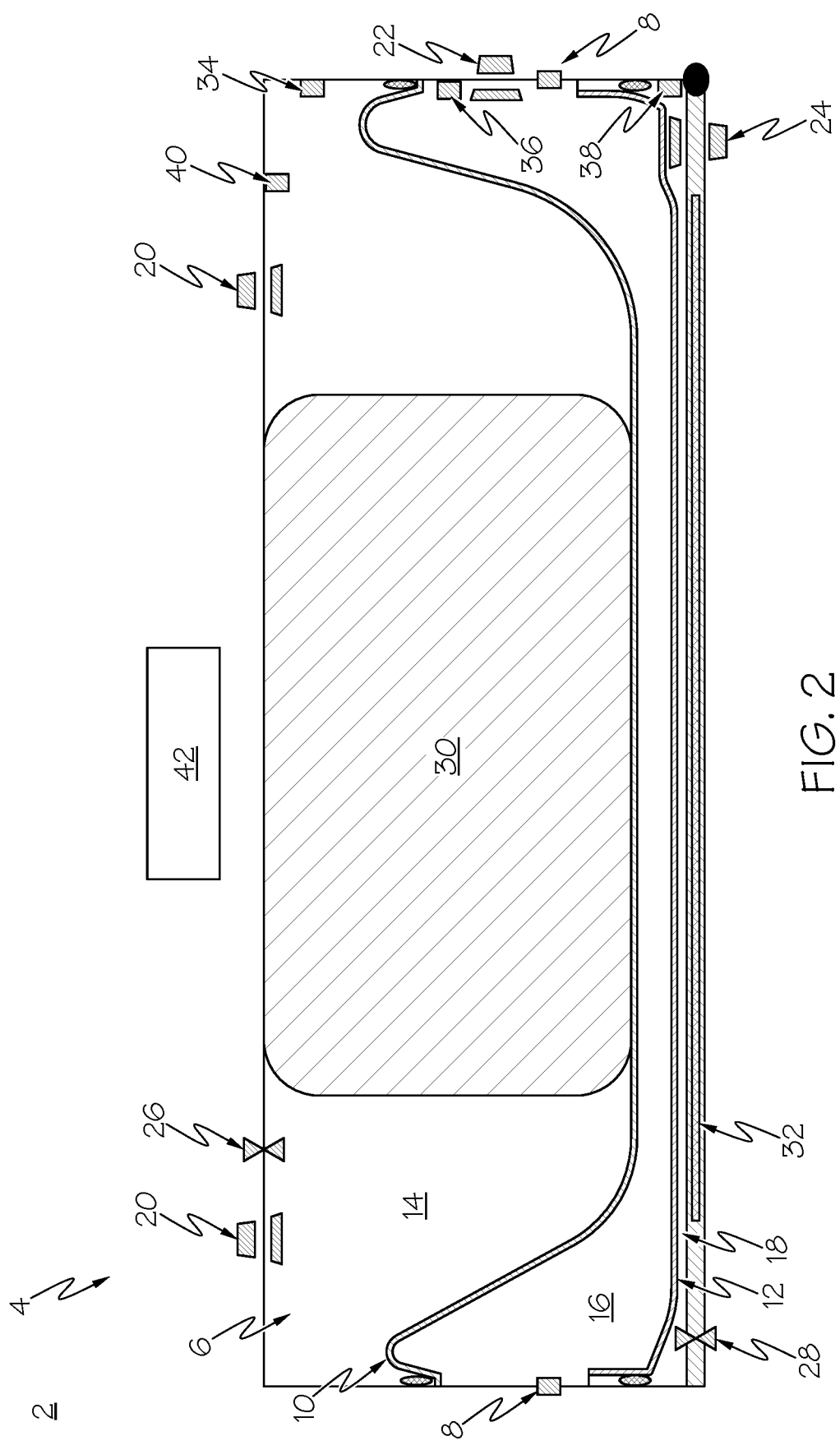
FIG. 2 illustrates an exemplary system of the present description for forming composite parts, which includes a housing with an enclosed chamber having a loading access, upper and lower membranes defining upper, middle, and lower cavities, and vacuum ports and pressure control valves for regulating pressure in the cavities. A forming tool is located in the upper cavity, and a heater, pressure sensors, a temperature sensor, and a controller are included to manage and adjust operational parameters based on sensor inputs.

With reference to FIG. 2, a system (2) for forming composite parts is disclosed. The system (2) comprises a housing (4) defining an enclosed chamber (6) therein. The chamber (6) includes a loading access (8) that facilitates introduction and removal of materials. Within said chamber (6), an upper membrane (10) is disposed, defining an upper cavity (14) thereabove. Below the upper membrane (10) is a lower membrane (12), which defines a middle cavity (16) between the upper membrane (10) and the lower membrane (12), and a lower cavity (18) beneath the lower membrane (12). The loading access (8) is in direct communication with the middle cavity (16). The system (2) further includes a first vacuum port (20) fluidly connected to the upper cavity (14), a second vacuum port (22) fluidly connected to the middle cavity (16), and a third vacuum port (24) fluidly connected to the lower cavity (18). A first pressure control valve (26) is configured to regulate pressure within the upper cavity (14) and a second pressure control valve (28) is configured to regulate pressure within the lower cavity (18). A forming tool (30) is disposed within the upper cavity (14). The system (2) may comprise a heater (32) operatively coupled to the housing to provide heat to the chamber (6). Pressure sensors (34), (36), (38) may be associated with each of the cavities for monitoring pressure conditions, and a temperature sensor (40) may be associated with the chamber (6) for monitoring temperature conditions. A controller (42) may be provided for managing and adjusting operational parameters based on input from the sensors.

The housing (4) is fabricated from a material or combination of materials, which may include high-strength metals or alloys, to contain varying pressures within the chamber (6) and resist temperature variations. The housing (4) may include additional features, such as reinforcements to enhance its structural integrity or an observation window or inspection port to allow visual inspection of internal operations.

The loading access (8) is provided for introducing and removing materials from the chamber and may take various configurations including, but not limited to, a hinged door, sliding door, or a removable panel. Sealing mechanisms, exemplified by, but not limited to, gaskets, may be integrated with the loading access to ensure and maintain the airtight condition of the chamber.

The upper membrane (10) and the lower membrane (12) are designed for adaptability to various design configurations. In the illustrated embodiment, both membranes are sealed around their peripheries to the housing, segmenting the chamber (6) into the corresponding cavities. The upper membrane and the lower membrane may be substantially impermeable to air such that the membrane maintain a pressure differential between adjacent cavities. Several properties, including heat resistance, resilience, and elasticity, may be considered when selecting materials for these membranes. Given their potential exposure to elevated temperatures, especially during the curing phase, the membranes may be made from materials that offer resistance to thermal degradation. The membranes are intended to return to their original form after being subjected to external forces, making them suitable for repeated cycles of pressure modulation. Elasticity allows the membranes to stretch and compress according to the changing pressures within the cavities. An elastic nature allows for adaptation to varying thicknesses or types of composite materials, and facilitates even pressure against the forming tool. With these properties in mind, materials such as silicone or elastomeric composites may be selected for constructing the membranes. Silicone offers elasticity, thermal stability, and non-reactivity. Elastomeric materials provide elasticity, resilience, and potential chemical resistance. Additionally, the membranes could be treated or coated to provide specific properties, such as anti-adhesive characteristics for easy separation from composite materials.

The spatial configurations of the upper cavity (14), middle cavity (16), and lower cavity (18) are intrinsically tied to the placement and movement of the upper membrane (10) and the lower membrane (12) within the chamber (6). In the illustrated embodiment, the upper cavity (14) is delineated by the chamber's upper boundary and the upper face of the upper membrane (10). The middle cavity (16) is formed between the lower face of the upper membrane (10) and the upper face of the lower membrane (12). Meanwhile, the lower cavity (18) is defined by the lower face of the lower membrane (12) and the chamber's bottom boundary. The membranes, affixed around their entire peripheries to the chamber housing, define a clear and stable partition between these cavities. The first vacuum port (20), second vacuum port (22), and third vacuum port (24) are designed to evacuate air from their respective cavities and are connected to an external vacuum source. The structure of each vacuum port may include a variety of components, such as a hollow, tubular conduit that provides a passageway for air to flow from the cavity to the external vacuum source. Each conduit may be equipped with a one-way valve that allows air to be sucked out of the cavity but prevents air or any other substance from entering back into the cavity. Each vacuum port may also have a connection mechanism such as a flange or a coupling that facilitates secure attachment to both the chamber housing and the external vacuum source. The vacuum ports may also be integrated with the pressure sensors (34), (36), (38) to monitor the pressure in the cavities in real-time and help in regulating the vacuum applied. The external vacuum source connected to the vacuum ports can be a vacuum pump or any other device capable of creating a vacuum. This pump may be controlled manually or automatically through the controller (42) to adjust the vacuum level in the cavities as needed.

The first pressure control valve (26) and the second pressure control valve (28) are components designed to modulate the pressure within the upper cavity (14) and lower cavity (18), respectively. These valves may be connected to external sources of compressed air or nitrogen and can be operated manually or automatically, based on user requirements. The structure of the pressure control valves is designed to be adaptable to various configurations and may include common components found in typical pressure control valves, such as a valve body, a valve seat, and an actuator. The actuator can be manual or automatic, such as a pneumatic or electric actuator. Automatic actuators can be remotely controlled or operated by the controller (42). The controller (42) may receive signals from the pressure sensors (34), (36), (38) and adjust the actuation of the valve accordingly to maintain the desired pressure within the cavities. In an aspect, the first pressure control valve (26) may share the same physical aperture in the housing with the first vacuum port (20), and the second pressure control valve (28) may share the same physical aperture in the housing with the third vacuum port (24). This shared aperture design would help to minimize the number of openings in the chamber housing. The forming tool (30) functions as a template against which composite materials are pressed in shaping the composite materials during the forming process. The forming tool depicted in the drawings is a cross-section of a rectangular block with rounded corners. This shape is particularly suited for the forming of U-shaped composite components. However, the invention is not confined to this specific shape and the forming tool can be tailored to accommodate various applications and composite materials. The structure of the forming tool may involve multiple elements or layers to accommodate specific needs, such as thermal or pressure distribution, and may involve features to facilitate release from the composite after forming. The tool may be constructed from a variety of materials, including but not limited to, metals, alloys, ceramics, or composites. Ultimately, the design and materials of the forming tool will be determined by the specifics of the application and the properties required of the final composite part.

The heater (32) can adopt various configurations, including but not limited to an electrical coil, infrared element, or other viable heating mechanisms. Its primary function is to provide a consistent and uniform thermal distribution within the chamber, according to the specific needs of the forming and curing processes. The heater can be positioned in various locations such as inside the chamber, outside the chamber, or integrated within the walls of the chamber, as shown in the drawings. Furthermore, the heater may be combined with the temperature sensor (40) to facilitate real-time monitoring and control of the temperature within the chamber. The temperature sensor may send signals to the controller (42), enabling it to modulate the heat output of the heater as needed to maintain the desired temperature. Additionally, the heater can be manually controlled or automated depending on the requirements of the operation. If automated, the controller (42) can regulate the heater's operation based on the data received from the temperature sensor (40), ensuring optimal temperature conditions for the forming and curing processes.

The pressure sensors (34), (36), (38) and temperature sensor (40) can transmit real-time data to a display or directly to the controller (42). The pressure sensors, located in each cavity, can monitor the pressure levels while the temperature sensor tracks the temperature within the chamber.

The controller (42) utilizes the data from the pressure and temperature sensors to adjust the system settings, modulating the heater, pressure control valves, and vacuum ports to maintain the specified conditions. It may feature a display, which could be a digital screen, a computer monitor, or another visual interface, to present real-time data from the sensors and allow manual adjustments of the system settings. Additionally, the system may include alarms or notifications that activate if the sensors detect conditions outside of specified ranges. This enables continuous monitoring and adjustment of pressure and temperature, which can improve the quality and consistency of the formed composite parts. Moreover, the controller can store pre-set profiles for different composite formation processes, allowing for quick and easy setup for various applications and materials.

The controller (42) is the central processing unit of the system and is responsible for managing and coordinating all the activities of the different components of the system. It may be implemented as a dedicated hardware device, or as a software application running on a general-purpose computer or a microcontroller. The controller receives input signals from the sensors, processes the signals, and then sends output signals to the various actuators, valves, and the heater to adjust their operation in real-time.

The controller may have a user interface that allows an operator to input parameters for the operation, such as desired temperature and pressure levels, and to monitor the current status of the system. The interface may include physical buttons, a touch screen, or may be operated remotely via a computer or mobile device. The user interface may also provide visual and/or auditory feedback to the operator, such as warning messages or alarms in case of malfunction or when the system parameters are out of the desired range.

The controller may include a memory for storing data, such as the current and historical sensor readings, system parameters, and operation logs. This data can be used for monitoring the performance of the system, troubleshooting, and for optimizing the operation for different materials and processes. The memory may also store pre-set profiles for different composite formation processes, which can be selected by the operator to quickly set up the system for a particular operation.

The controller may also include a communication interface for connecting to external devices, such as a computer or a network, for remote monitoring and control of the system. This can be useful for integrating the system into a larger manufacturing process or for remote maintenance and troubleshooting.

The controller may include various algorithms for controlling the operation of the system. For example, it may include a PID (Proportional-Integral-Derivative) control algorithm for maintaining the temperature and pressure at desired levels. The controller may also include algorithms for optimizing the heating and cooling cycles, for managing the vacuum and pressure levels in the different cavities, and for coordinating the operation of the various components of the system.

In an aspect, the system may comprise an autoclave, wherein the autoclave provides a number of functions of the system. The autoclave can be utilized for creating a controlled environment with the desired pressure and temperature conditions necessary for the forming and curing of composite materials. It may be equipped with its own heating element, pressure control valves, and vacuum ports, or it may be integrated with the existing components of the system. For example, the autoclave may be connected to the first, second, and third vacuum ports (20, 22, 24) and the pressure control valves (26, 28) to regulate the pressure in the cavities. Similarly, the heater (32) of the system may be used to control the temperature inside the autoclave, or the autoclave may have its own separate heating element. The controller (42) may be programmed to control the operation of the autoclave, adjusting the temperature, pressure, and vacuum levels as needed based on the sensor readings and the desired parameters for the operation. The autoclave may also include its own set of sensors for monitoring the temperature and pressure inside the chamber. These sensors can be connected to the controller (42) to provide real-time data for monitoring and control of the operation. Alternatively, the autoclave may have its own separate controller and user interface for setting up and monitoring the operation. In this case, the two controllers may be connected and programmed to coordinate the operation of the autoclave and the system. The autoclave may be designed to accommodate the forming tool (30) and the composite materials, and it may include features for facilitating the loading and unloading of materials. For example, it may include a loading access with sealing mechanisms to maintain the airtight condition of the chamber. The autoclave may also include features for facilitating the release of the composite materials from the forming tool after the curing process is completed.

The subsequent sections describe a series of steps illustrated in FIGS. 3 to 12, detailing the process of preparing an uncured composite material, particularly a multi-layered fiber-reinforced resin, through various stages of vacuum application, forming, and curing to create a final, cured composite product. In these figures, several components such as the loading access (8), the pressure sensors (34), (36), (38), the temperature sensor (40), and the controller (42) are omitted for simplicity of illustration. This simplification helps to focus the description on the aspects of the process involving the upper and lower membranes, the forming tool, and the composite material itself.

Figure 3:
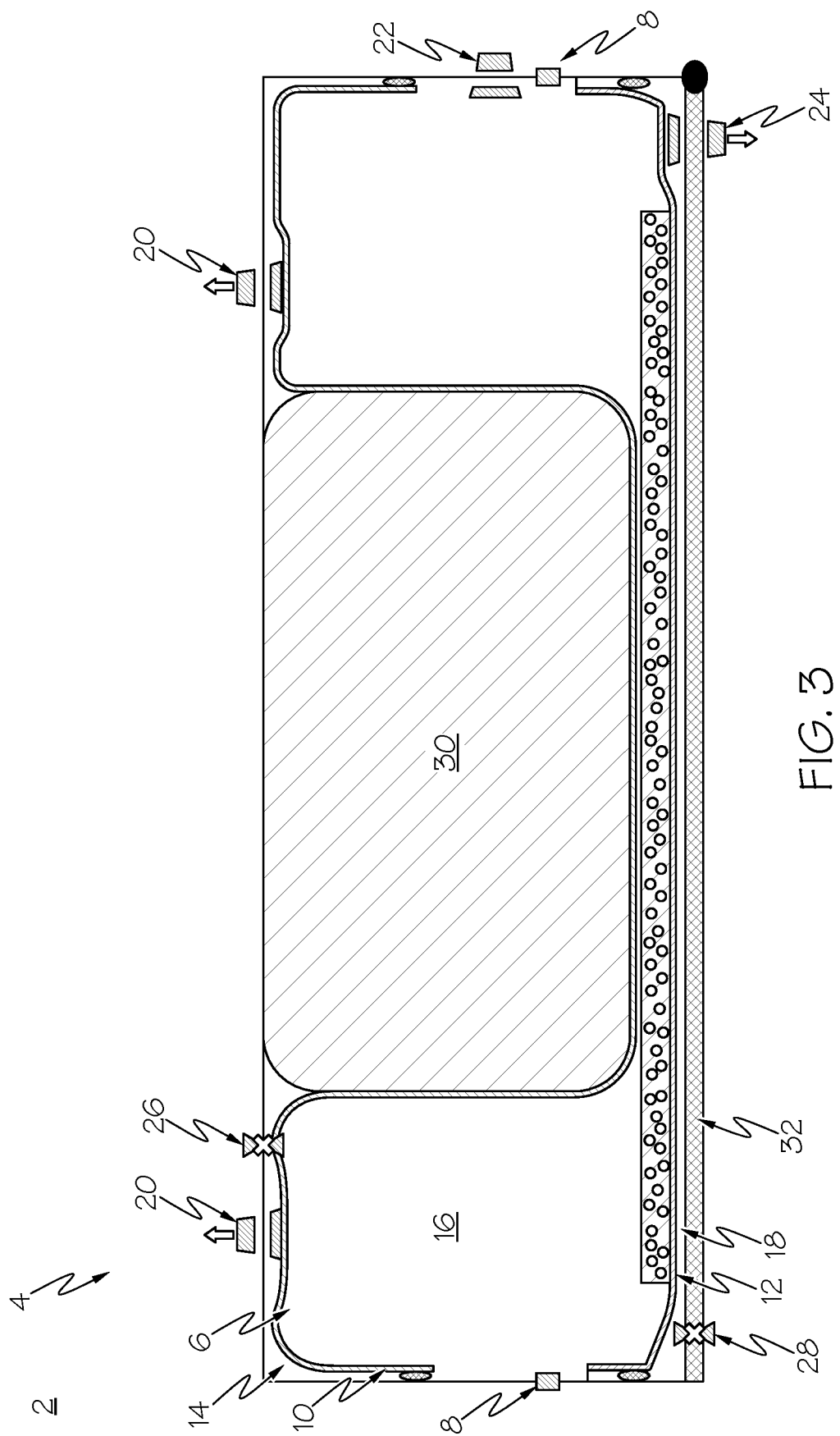
FIG. 3 illustrates the exemplary system of FIG. 2 after loading the uncured composite material into the middle cavity and applying vacuum to the upper and lower cavities, minimizing contact between the material and membranes and lifting the forming tool from the material.
Figure 4:
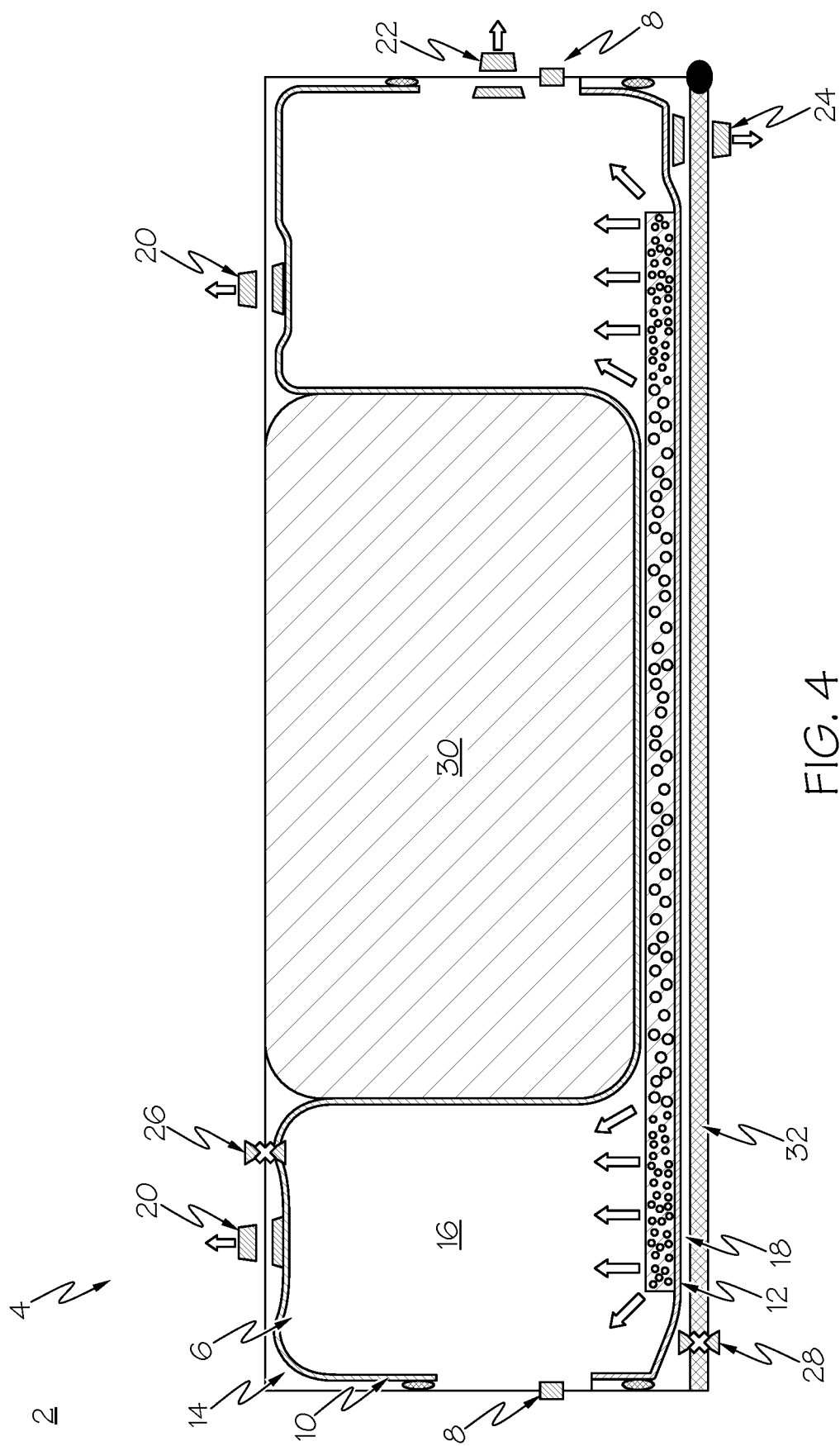
FIG. 4 illustrates the exemplary system of FIG. 2 after applying a vacuum to the middle cavity, which aids in expelling entrapped gases from the material.

FIG. 3 illustrates the system (2) after the uncured composite material, particularly a multi-layered fiber-reinforced resin, is loaded into the middle cavity (16) between the upper membrane (10) and the lower membrane (12), and after the vacuum has been applied to the upper cavity (14) through the first vacuum port (20) and the lower cavity (18) through the third vacuum port (24). This step leading to FIG. 3 involves placing the uncured composite material, which may include several plies of fiber-reinforced resin, into the middle cavity of the chamber. A vacuum is then applied to both the upper and lower cavities, which retracts the upper and lower membranes, minimizing or avoiding contact between the uncured composite material and the membranes, also lifting the forming tool from the uncured composite material creating a spacing between the upper membrane and the uncured composite material. As illustrated in FIG. 4, the uncured composite material includes voids or gas inclusions within the material.

Next, FIG. 4 illustrates the system (2) after the vacuum has been applied to the middle cavity (16). This is a step in the process that facilitates the expulsion of entrapped gases, including voids or gas inclusions illustrated in FIG. 3, from within the uncured composite material. By reducing the pressure within the middle cavity, the vacuum assists in drawing out these entrapped gases, thus aiding in the de-gassing process. As mentioned earlier, these entrapped gases can lead to the formation of voids or inclusions within the material, which in turn affect its mechanical, thermal, and electrical properties. Therefore, their removal is important for the integrity of the final cured product. The vacuum applied to the upper and lower cavities minimizes contact between the uncured composite material and the upper and lower membranes. This is advantageous as it prevents undesirable compression of the composite material by the membranes and forming tool during the de-gassing process, ensuring the material remains undisturbed and retains its original structural properties. Moreover, the application of vacuum to the upper and lower cavities ensures a more uniform de-gassing process and allows for real-time adjustments if needed. This is significant as it helps to prevent the formation of voids and inclusions throughout the uncured composite material, leading to a higher quality final product.

Figure 5:
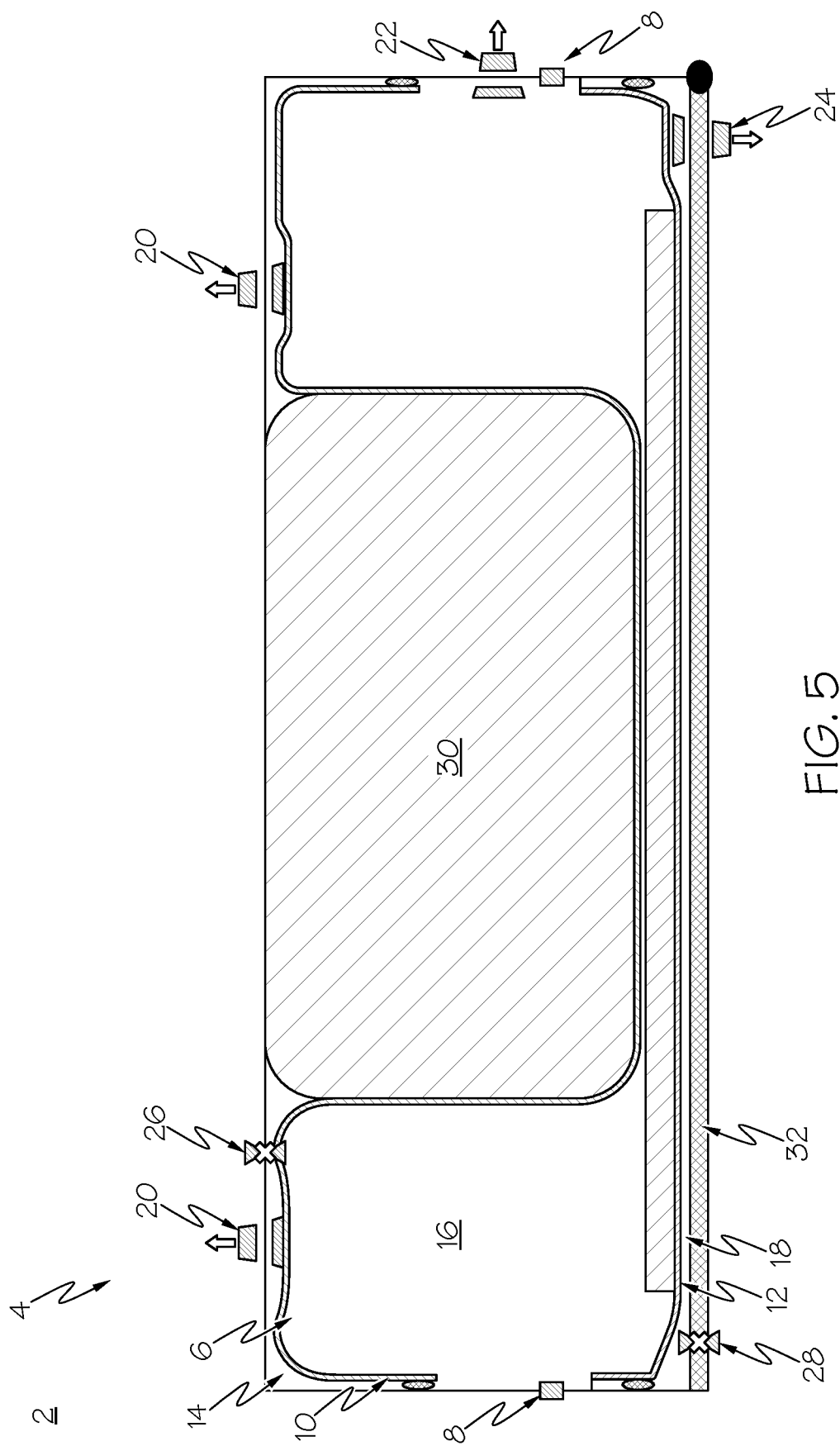
FIG. 5 illustrates the exemplary system of FIG. 2 after the material has been de-gassed.

FIG. 5 illustrates the system (2) after the uncured composite material has been de-gassed, resulting in a gas-free uncured composite material. At this stage, all entrapped gases, voids, and inclusions that were present within the layers of the uncured composite material have been successfully removed due to the vacuum application in the previous steps. This is a significant moment in the process as it ensures that the composite material is now in its optimal state for the subsequent forming and curing processes. The absence of gases, voids, and inclusions means that the material will have enhanced structural integrity, better load distribution, and improved mechanical, thermal, and electrical properties once it is cured. Furthermore, the de-gassing of the material validates the effectiveness of the vacuum application process, which minimizes contact between the uncured composite material and the membranes, thereby avoiding unintended compression and ensuring a more uniform de-gassing process. This stage sets the foundation for the next steps in the composite formation process, ensuring that the uncured composite material is adequately prepared for forming and curing.

Figure 6:
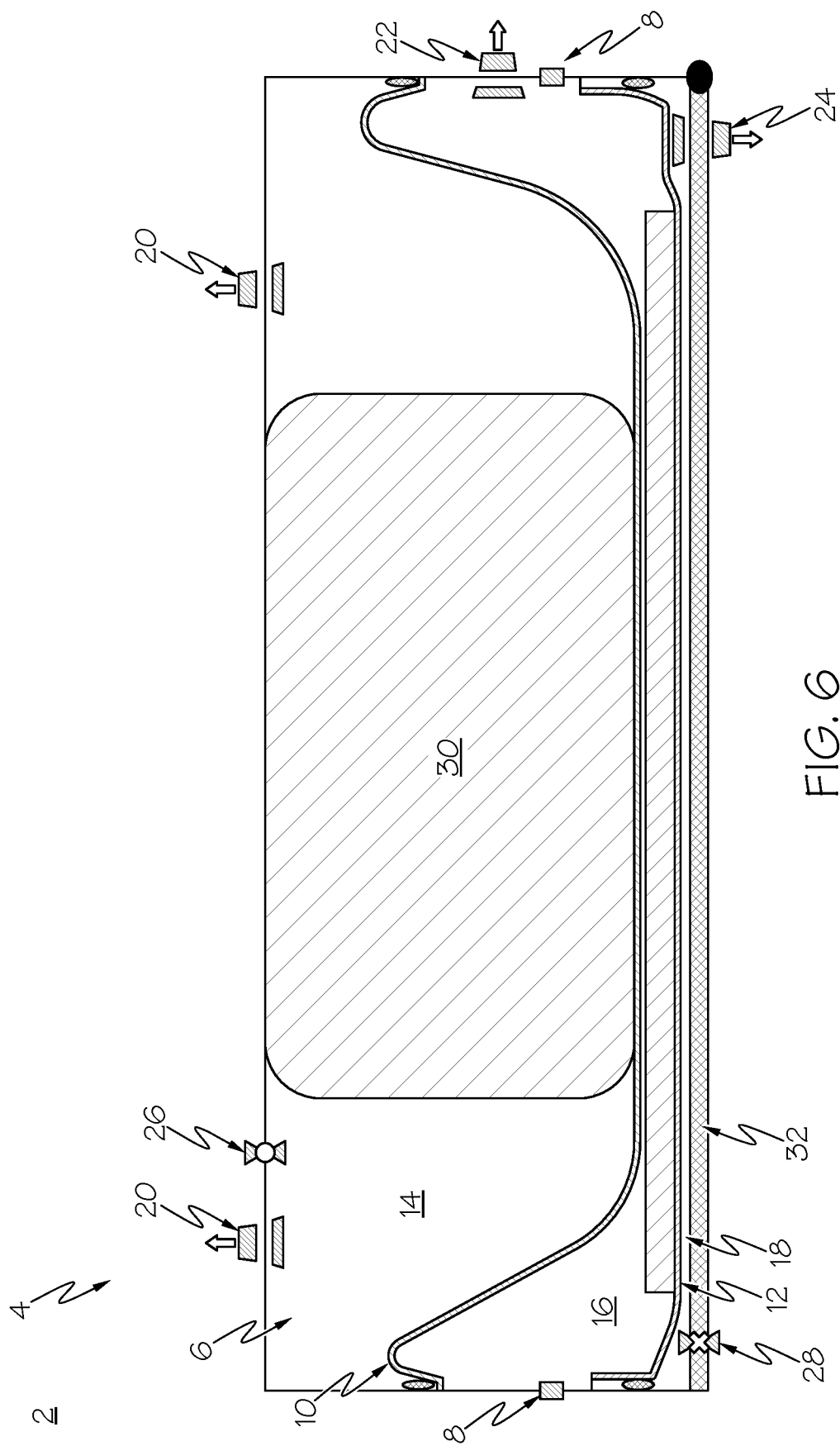
FIG. 6 illustrates the exemplary system of FIG. 2 after releasing the vacuum from the upper cavity, causing the upper membrane and forming tool to drop and support the material.

FIG. 6 illustrates the system (2) after the vacuum from the upper cavity (14) is released and the control valve (26) is opened, causing the upper membrane (10) to drop and provide support to the uncured composite material. Additionally, releasing the vacuum from the upper cavity causes the forming tool to drop and press against the uncured composite material. This action is important as it ensures the support of the uncured composite material by the upper membrane and avoids premature forming that may occur if the lower cavity vacuum was released before the upper cavity vacuum. Initiating the heating of the chamber to reach the forming temperature of the uncured composite material is a critical step in preparing the material for forming. However, it is not mandatory to initiate heating at this stage, and it could be delayed depending on the specific requirements of the composite material being used and the desired properties of the final product. Bringing the composite material to its forming temperature ensures that it is pliable and can be formed into the desired shape without risking damage to the fibers or the resin matrix. It also helps ensure that the composite material will fully conform to the shape of the forming tool during the forming process. Delaying the heating could be advantageous in some scenarios, for example, to save energy or to synchronize with other steps in the manufacturing process. This stage sets the stage for the next steps in the process, where the composite material will be formed into its final shape.

Figure 7:
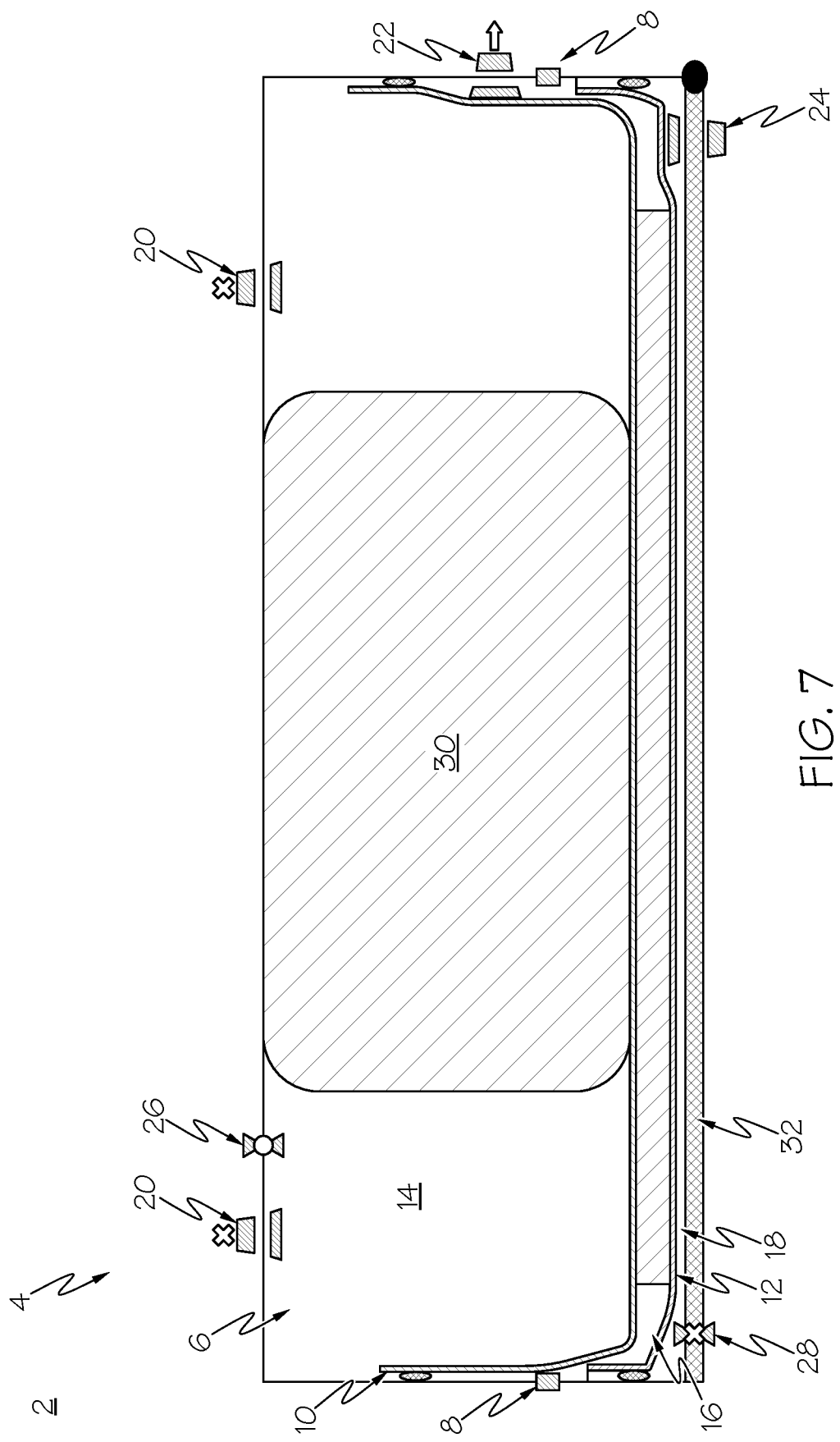
FIG. 7 illustrates the exemplary system of FIG. 2 after releasing the vacuum from the lower cavity, causing the lower membrane to move up against the material. Both membranes now conform to the material.

FIG. 7 illustrates the system (2) after the vacuum from the lower cavity (18) is released and the control valve (28) is opened. At this stage, the lower membrane (12) moves up against the uncured composite material, sandwiching the uncured composite material between the upper (10) and lower membranes (12). Releasing the vacuum from the lower cavity after the upper cavity ensures that the uncured composite material is not prematurely formed by the lower membrane, avoiding any unwanted deformation. With the vacuum in the middle cavity (16) still maintained, both the upper and lower membranes are now conformed to the uncured composite material, which aids in uniformly distributing pressure during the subsequent forming and curing processes. This is important as it ensures that the material conforms accurately to the desired shape, ultimately leading to a final product with optimal structural properties. Moreover, this step helps in preventing any misalignment of fibers or uneven distribution of the resin, which could lead to defects in the final cured product. With the upper and lower membranes conformed to the uncured composite material due to the vacuum maintained in the middle cavity, the system is now ready for the next steps, where the composite material will be formed and subsequently cured to create the final product.

Figure 8:
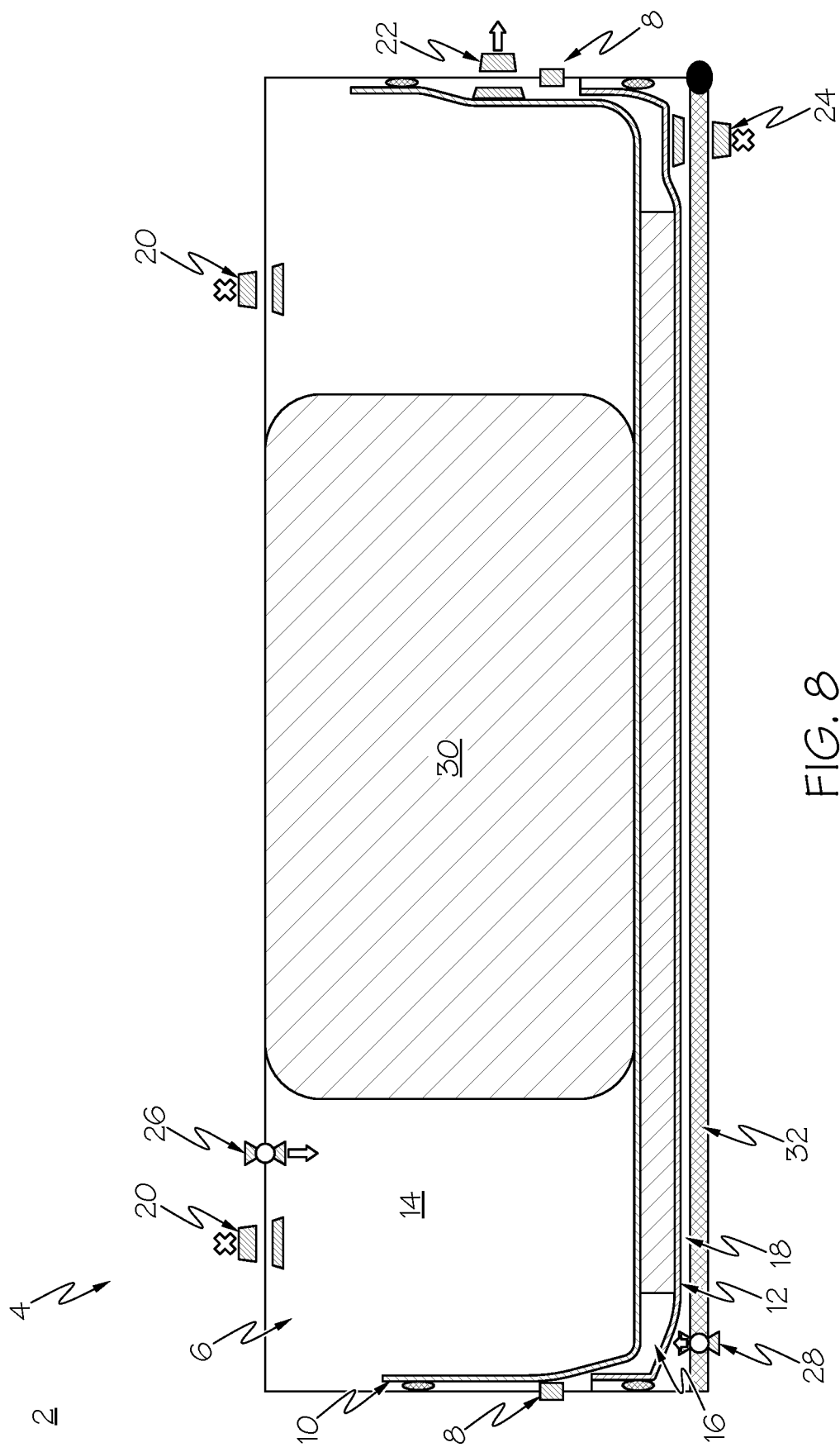
FIG. 8 illustrates the initial phase of the forming process in the exemplary system of FIG. 2, where gases are introduced through control valves into the upper and lower cavities, pressing both membranes against the uncured composite material and beginning its transformation into the desired shape.

FIG. 8 shows the initiation of the forming process in which the upper cavity and the lower cavity are beginning to be pressurized by the introduction of gases through control valve (26) and control valve (28). This step marks the beginning of the actual forming process, where the uncured composite material starts to take the desired shape. The introduction of gases into the upper and lower cavities ensures that both membranes are pressed firmly against the uncured composite material, which will helps in accurately forming the material around the forming tool. This step sets the stage for the subsequent stages of the process, where the pressure will be increased further to complete the forming of the uncured composite material. With the upper and lower membranes conformed to the uncured composite material due to the vacuum maintained in the middle cavity, the system is now ready for the next steps, where the composite material will be formed and subsequently cured to create the final product.

Figure 9:
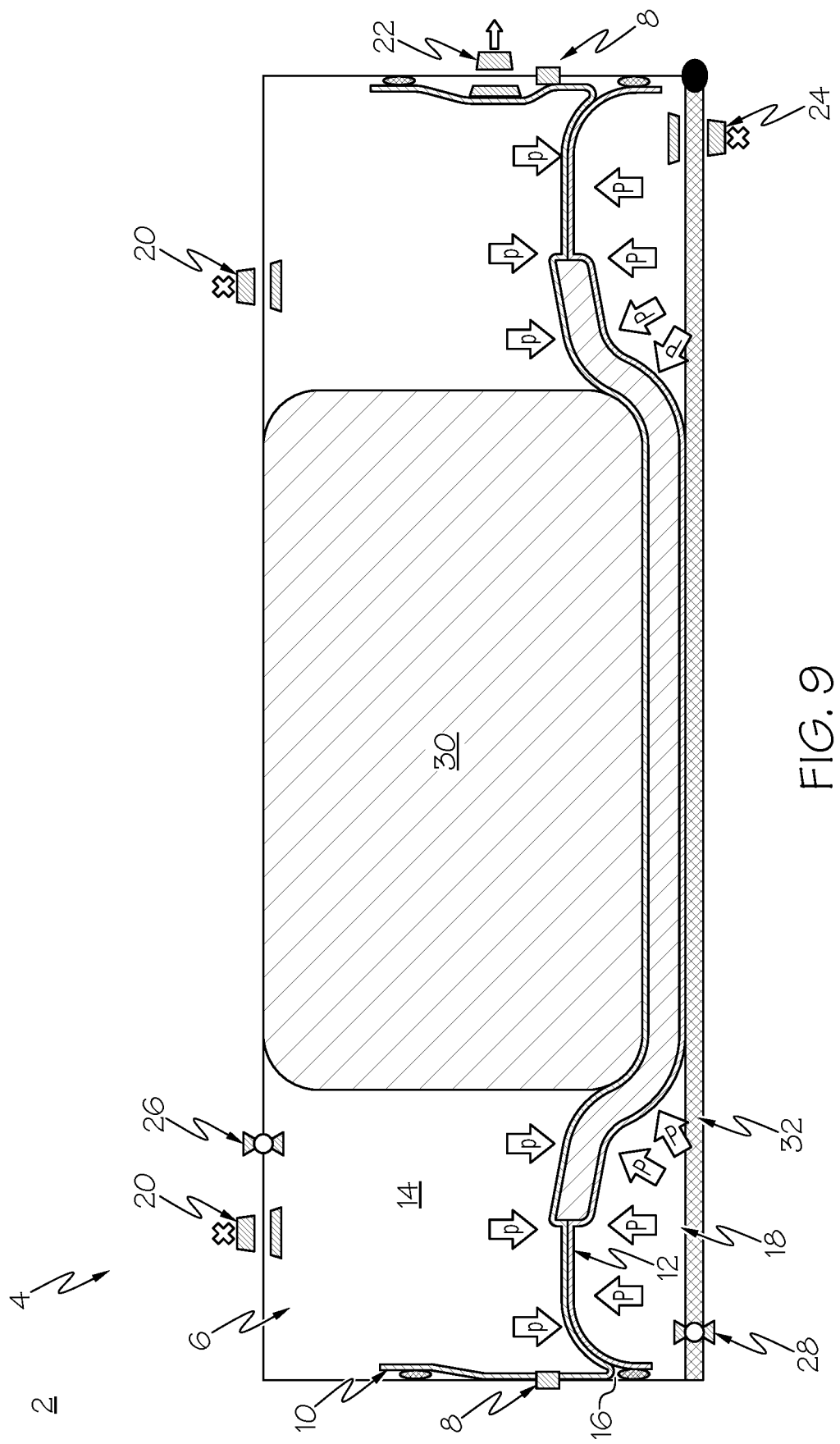
FIG. 9 illustrates the middle phase of the forming process in the exemplary system of FIG. 2, where the pressure applied to the upper and lower cavities is regulated to shape the heated composite material around a forming tool.

FIG. 9 shows the forming process during the forming of the uncured composite material. In this stage, the pressures applied to the upper and lower cavities are controlled to form the heated composite material. A aspect of this process is that a greater pressure is applied to the lower cavity than to the upper cavity, creating a pressure differential between the two cavities. This pressure differential causes the lower membrane to exert a greater force on the composite material, thereby forcing it to form around the forming tool. This control of the pressure is advantageous for several reasons. Firstly, it ensures that the composite material is accurately formed to the desired shape, which allows the final product to have the intended structural properties and dimensional accuracy. Secondly, it minimizes the risk of damaging the fibers or the resin matrix of the composite material. Moreover, the pressure in the upper cavity provides support to the uncured composite material, inducing an equalized shear and resulting in an S-shape of the laminate as the greater lower cavity pressure forms the uncured composite material around the forming tool. This helps to distribute the forces more evenly across the material, reducing the risk of localized stress concentrations that could lead to defects or weaknesses in the final product. Additionally, the pressure differential between the upper and lower cavities also helps to control the forming speed of the uncured composite material. The greater the pressure difference between the lower and upper cavities, the greater the forming speed. This is significant because the rate at which the material is formed can impact its final properties. Forming the material too quickly can cause wrinkles, while forming too slowly can be inefficient. By carefully controlling the pressure differential, it is possible to optimize the forming speed, achieving maximizing efficiency and quality.

Figure 10:
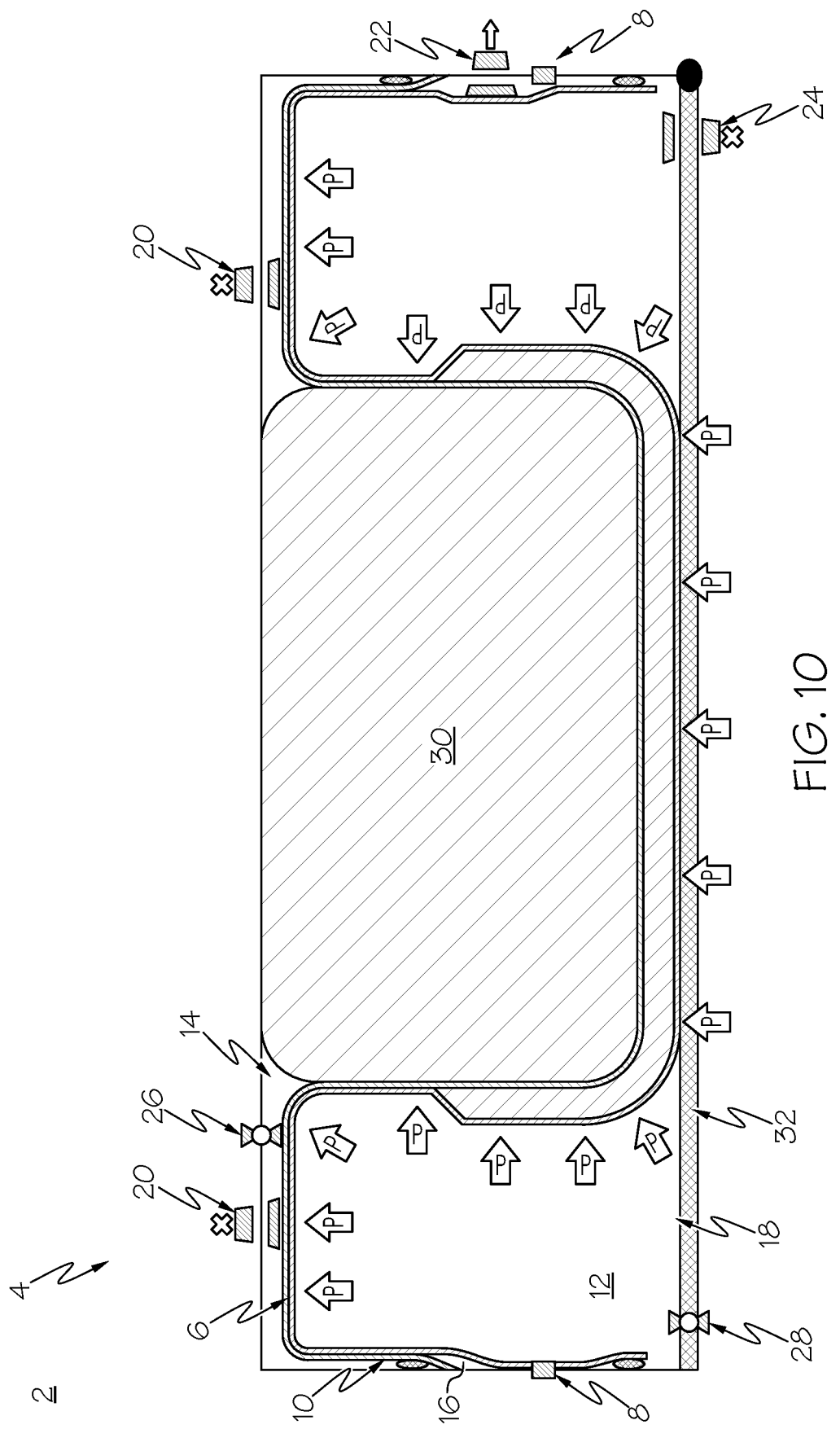
FIG. 10 illustrates the exemplary system of FIG. 2 after the forming process is complete, indicating that the uncured composite material has been successfully shaped without damaging its fibers or resin matrix.

FIG. 10 illustrates the system (2) once the forming process is complete. At this stage, the lower membrane has successfully wrapped the uncured composite material around the forming tool, conforming it entirely to the desired shape. This stage signifies that the material has been accurately formed without causing any damage to the fibers or the resin matrix. The controlled pressure differential between the upper and lower cavities ensured that the material was formed at an optimal speed, minimizing the risk of defects such as wrinkles or voids. Now that the forming process is complete, the composite material is in its final shape but still in an uncured state.

Figure 11:
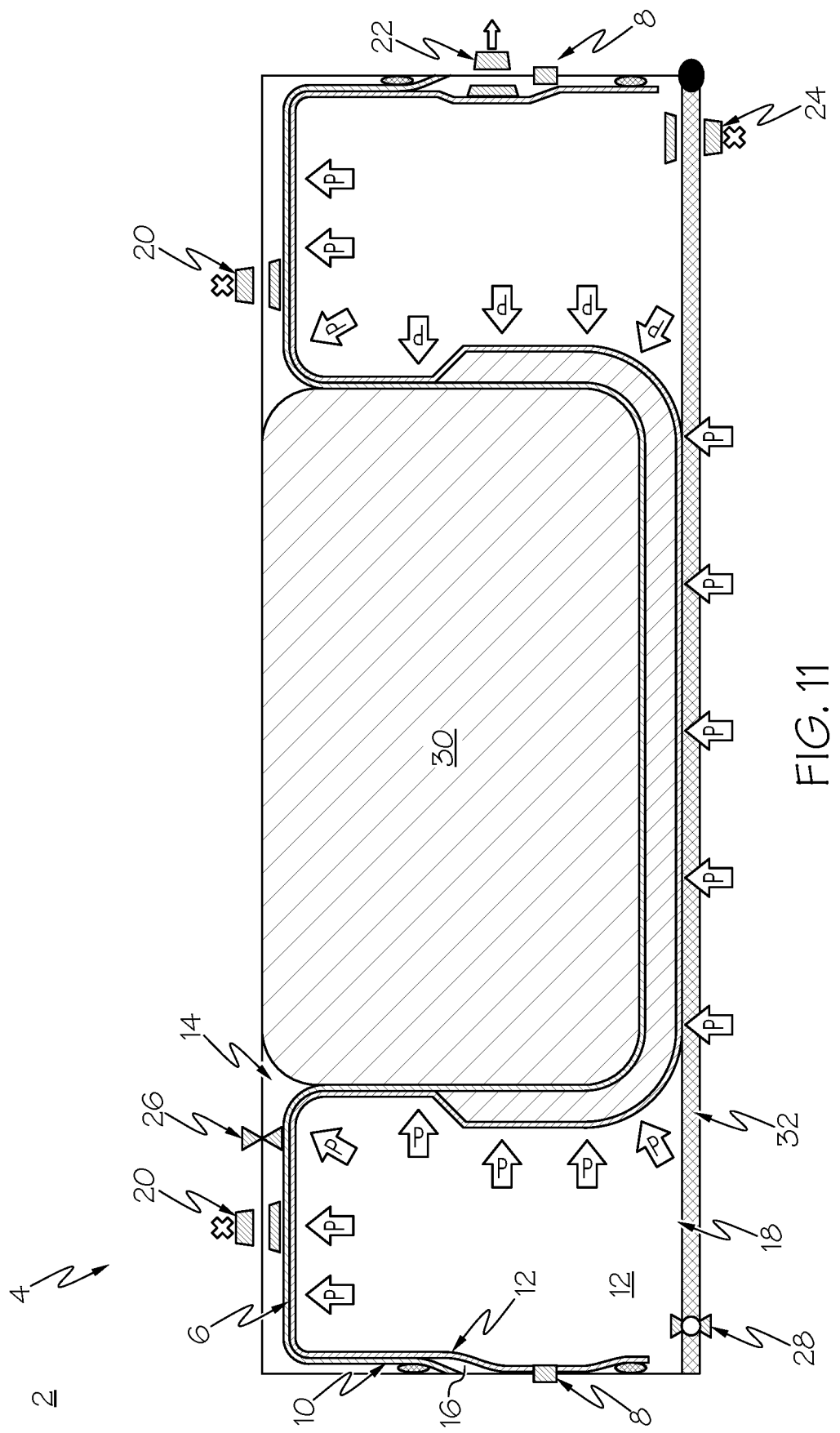
FIG. 11 illustrates the exemplary system of FIG. 2 during the curing process, wherein heat and pressure are applied to initiate chemical reactions in the resin matrix, transforming the material from a pliable, uncured state to a rigid, cured state.

FIG. 11 illustrates the system (2) during the curing process. At this stage, the chamber is heated to a specified curing temperature and a curing pressure is applied to both the upper and lower cavities. This step uses the application of heat and pressure initiates the chemical reactions within the resin matrix, causing it to harden and solidify. The heat and pressure ensures that the resin fully impregnates the fibers, binding them together and creating a strong, cohesive structure. This process transforms the material from a pliable, uncured state into a rigid, cured composite material with enhanced structural properties. The temperature and pressure are controlled during this process to ensure that the resin cures uniformly throughout the material, avoiding the formation of any internal stresses or defects. Additionally, the pressure applied to the upper and lower cavities helps to compact the material, reducing any residual voids and ensuring optimal fiber volume fraction. The curing process may vary in duration and parameters depending on the specific resin system used and the desired properties of the final product. Once the curing process is complete, the composite material will have achieved its final mechanical, thermal, and electrical properties, making it suitable for its intended application. This cured composite material will exhibit enhanced strength, stiffness, and durability compared to its uncured state.

It is significant to note that the vacuum in the middle cavity, created during the de-gassing process, is maintained throughout the method at least until the end of the curing process. Maintaining the vacuum ensures that the composite material is not exposed to any external environment after the de-gassing process, which is important for several reasons. Firstly, it helps in preventing the ingress of any external gases or contaminants into the material prior to or during the curing process. Any exposure to external gases, moisture, or contaminants can lead to the formation of voids, inclusions, or other defects within the material, affecting its final properties and performance. Secondly, maintaining the vacuum helps in maintaining a constant pressure on the composite material throughout the curing process. This ensures that the material remains compacted and conforms closely to the shape of the forming tool, leading to a final product with optimal structural properties and dimensional accuracy. Lastly, maintaining the vacuum helps in preventing any chemical degradation of the composite during the curing process. Exposure to oxygen or other reactive gases can lead to chemical reactions that may degrade the material or alter its properties. Therefore, maintaining the vacuum in the middle cavity from the de-gassing process through the curing process is significant for ensuring the quality and performance of the final cured composite material.

Figure 12:
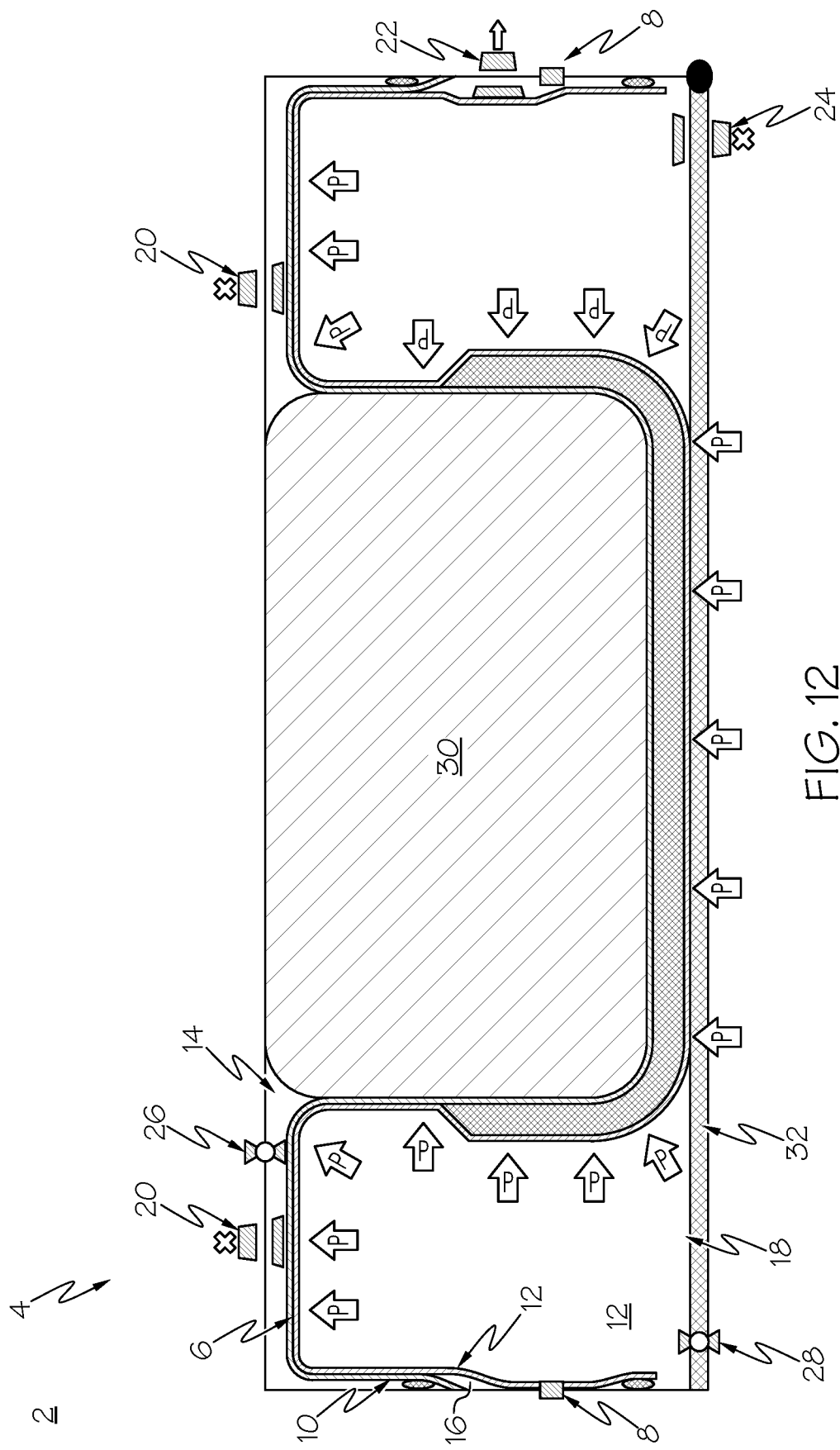
FIG. 12 illustrates the exemplary system of FIG. 2 after the curing process and cooling, but before the cured composite material is removed from the chamber.

FIG. 12 illustrates the system (2) after the curing process is complete and the system has been cooled, but before the cured composite material is removed from the chamber. During the cooling, the pressure in the upper and lower cavities is reduced. Reducing the pressure may help in easing the removal of the formed and cured composite material from the forming tool. High pressure might cause the material to adhere strongly to the forming tool, making it difficult to remove without causing damage. Secondly, reducing the pressure helps in minimizing any residual stresses within the material that might have developed during the forming and curing processes. Therefore, reducing the pressure helps in ensuring that the final product retains its desired shape and dimensions after removal from the chamber. Once the pressure is reduced and the cured composite material is removed, the chamber can be prepared for the next batch of composite material.

Figure 13:
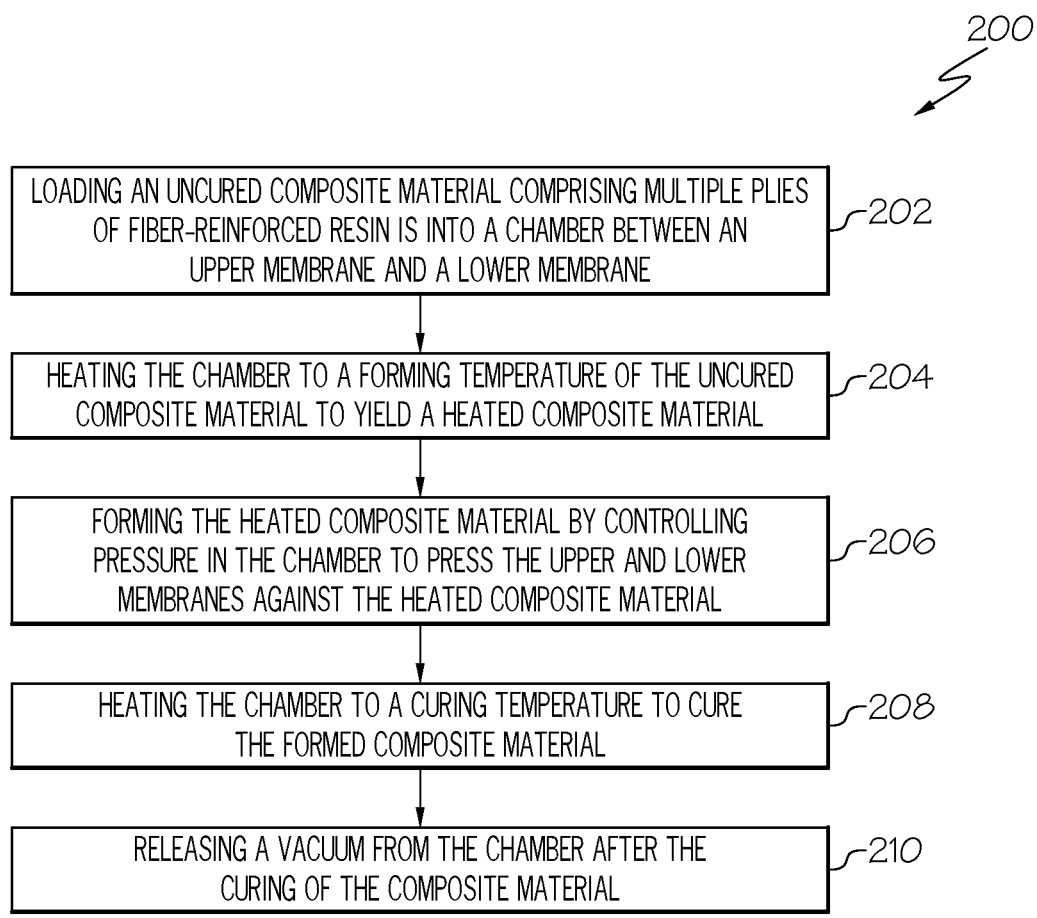
FIG. 13 is a flow diagram illustrating an alternative method of the present description for forming composite parts. The process includes loading the uncured composite material into a chamber, heating the chamber, controlling the pressure to form the material, and heating the chamber again to cure the formed material.

FIG. 13 is a flow diagram illustrating another method (202) of forming composite parts. The process begins with step (202), wherein an uncured composite material comprising multiple plies of fiber-reinforced resin is loaded into a chamber between an upper membrane and a lower membrane. Next, in step (204), the chamber is heated to a forming temperature of the uncured composite material to yield a heated composite material. This step is important for ensuring that the composite material is at the necessary temperature for forming. In step (206), the heated composite material is formed by controlling pressure in the chamber to press the upper and lower membranes against the heated composite material. This step shapes the composite material into its final form. Then, in step (208), the chamber is heated to a curing temperature to cure the formed composite material, thereby yielding a cured composite material. This step hardens the formed composite material and ensures its structural integrity. Optionally, in step (210), a vacuum from the chamber can be released after the curing of the composite material. This step helps in ensuring that any residual gases trapped in the material are removed.

In one embodiment, the pressure control within the chamber is executed without compacting the uncured composite material prior to heating. This approach reduces interply friction and enhances the forming ability by permitting the plies to slip over one another without inducing internal compression and wrinkles.

In another embodiment, the pressure control in the chamber is conducted by applying a greater pressure to the lower membrane than to the upper membrane, which results in a pressure differential between the lower and upper membranes that enables the heated composite material to conform to a desired shape.

In yet another embodiment, the pressure control in the chamber is managed such that the applied pressure results in an S-shaped deformation of the heated composite material as it is pressed upwards and conforms around the forming tool.

In a further embodiment, the process of heating the chamber to a curing temperature includes the step of pressurizing the chamber to a curing pressure while concurrently heating to the curing temperature.

In another aspect, a vacuum is applied to the heated composite material throughout the entire process of forming the heated composite material.

In a subsequent step, the method may involve releasing the vacuum from the chamber after the composite material has been cured. This helps to ensure that any residual gases trapped in the material are removed.

In a final step, the method may also include cooling the cured composite material after the curing process has been completed. This is important for stabilizing the material and preparing it for any subsequent processing or utilization.

Note that the method (200) described in FIG. 13 can further include any of the features from method (100) or system (2) as described above that are not explicitly detailed in the discussion of method (200). This means that while method (200) may be detailed with specific steps or features, it is not limited to only those described in FIG. 13. Instead, it can incorporate any other steps, features, or characteristics from method (100) or system (2) that have been described in previous sections but are not explicitly mentioned in the discussion of method (200). Therefore, method (200) should be understood as a flexible and adaptable approach that can be tailored to incorporate various features from method (100) or system (2) as necessary or desired.

Figure 14:
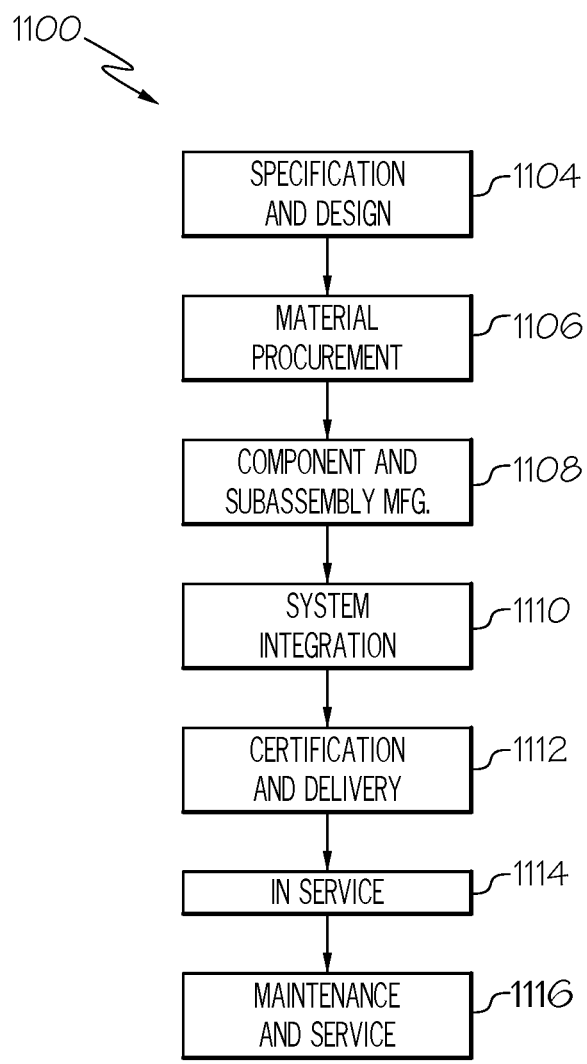
FIG. 14 is a block diagram of aircraft production and service methodology.
Figure 15:
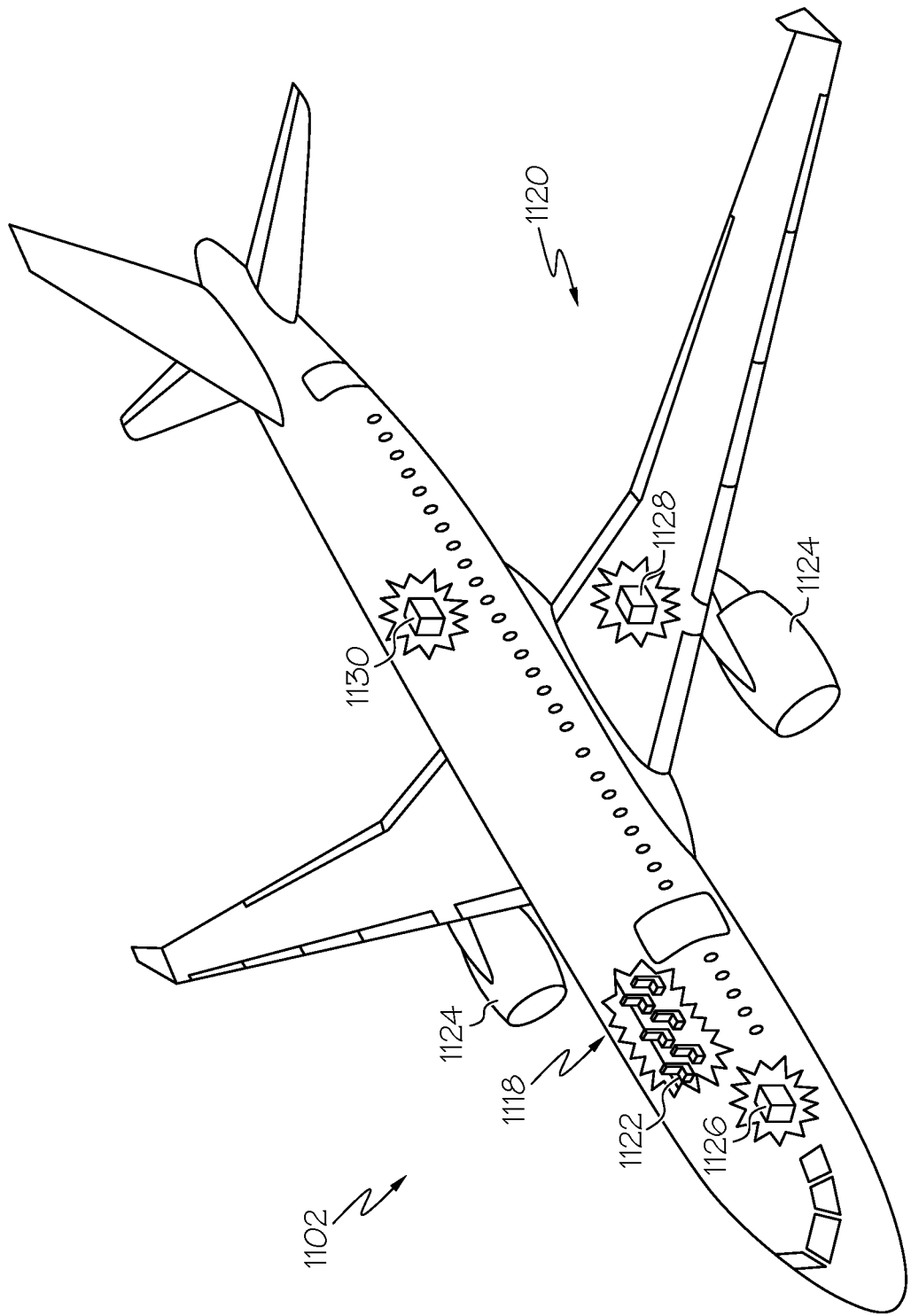
FIG. 15 is a schematic illustration of an aircraft.

Examples of the subject matter disclosed herein may be described in the context of aircraft manufacturing and service method 1100 as shown in FIG. 14 and aircraft 1102 as shown in FIG. 15. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 14, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages (block 1108 and block 1110), for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Although various embodiments of the disclosed systems and method have been shown and described, modifications may occur to those skilled in the art upon reading the specification. The present application includes such modifications and is limited only by the scope of the claims and their equivalents.

What is claimed is:

1. A method for forming composite parts, the method comprising the steps of:
    loading an uncured composite material into a middle cavity of a chamber between an upper membrane and a lower membrane, wherein a lower cavity is defined below the lower membrane, and wherein an upper cavity is defined above the upper membrane, wherein a forming tool is disposed within the upper cavity;
    applying a vacuum to the upper cavity, the middle cavity, and the lower cavity to remove at least a portion of gas entrapped within the uncured composite material;
    releasing the vacuum from the upper cavity and the lower cavity while maintaining the vacuum in the middle cavity;
    heating the chamber to a forming temperature of the uncured composite material to yield a heated composite material;
    after releasing the vacuum from the upper cavity and the lower cavity, controlling pressure in the upper cavity and the lower cavity to form the heated composite material, wherein a greater pressure is applied to the lower cavity than to the upper cavity such that a pressure differential between the lower cavity and the upper cavity causes the heated composite material to form around the forming tool; and
    heating the chamber to a curing temperature to cure the heated composite material, thereby yielding a cured composite material.

2. The method of claim 1, wherein, in the step of loading the uncured composite material into the middle cavity, the uncured composite material comprises a fiber-reinforced resin.

3. The method of claim 1, wherein, in the step of loading the uncured composite material into the middle cavity, the uncured composite material comprises multiple plies of fiber-reinforced resin.

4. The method of claim 1, wherein the step of applying the vacuum to the upper cavity, the middle cavity, and the lower cavity comprises applying the vacuum to the upper cavity and the lower cavity before applying the vacuum to the middle cavity.

5. The method of claim 1, wherein, in the step of applying the vacuum to the upper cavity, the middle cavity, and the lower cavity, the upper membrane is spaced from the uncured composite material.

6. The method of claim 1, wherein, in the step of releasing the vacuum, the vacuum is released from the upper cavity before the vacuum is released from the lower cavity.

7. The method of claim 1, wherein, in the step of heating the chamber to the forming temperature, the chamber is heated to the forming temperature before the vacuum is release from the upper cavity.

8. The method of claim 1, wherein, in the step of heating the chamber to the forming temperature, the chamber is heated to the forming temperature before the vacuum is release from the lower cavity.

9. The method of claim 1, wherein, in the step of heating the chamber to the forming temperature, the forming temperature of the chamber is between about 45° C. and 200° C.

10. The method of claim 1, wherein, in the step of controlling pressure in the upper cavity and the lower cavity to form the heated composite material, the pressure differential between the lower cavity and the upper cavity, combined with positioning of the heated composite material between the upper membrane and the lower membrane, results in an S-shaped deformation of the heated composite material as it is pressed upwards and conforms around the forming tool.

11. The method of claim 1, wherein, in the step of controlling pressure in the upper cavity and the lower cavity to form the heated composite material, the pressure differential between the lower cavity and the upper cavity is between about 1 psi and about 100 psi.

12. The method of claim 1, wherein, in the step of heating the chamber to a curing temperature to cure the heated composite material, the upper cavity and the lower cavity are pressurized to a curing pressure while the chamber is heated to the curing temperature.

13. The method of claim 1, wherein, in the step of heating the chamber to a curing temperature to cure the heated composite material, the curing temperature of the chamber is between about 100° C. and 250° C.

14. The method of claim 1, wherein the vacuum is maintained in the middle cavity through the forming of the heated composite material.

15. The method of claim 1, wherein the vacuum is maintained in the middle cavity through the heating of the chamber to the curing temperature to cure the heated composite material.

16. The method of claim 1, further comprising a step of releasing the vacuum from the middle cavity after curing of the cured composite material.

17. The method of claim 1, further comprising a step of cooling the cured composite material.

18. A method for forming composite parts, the method comprising:
    loading an uncured composite material comprising multiple plies of fiber-reinforced resin into a middle cavity of a chamber between an upper membrane and a lower membrane, wherein an upper cavity is defined above the upper membrane and a lower cavity is defined below the lower membrane;
    applying a vacuum to the upper cavity, the middle cavity, and the lower cavity;
    heating the chamber to a forming temperature of the uncured composite material to yield a heated composite material;
    forming the heated composite material by controlling pressure in the upper cavity and the lower cavity in the chamber to press the upper membrane and the lower membrane against the heated composite material, while maintaining a vacuum in the middle cavity throughout the forming of the heated composite material; and
    heating the chamber to a curing temperature to cure the formed composite material, thereby yielding a cured composite material.

19. The method of claim 18, wherein controlling pressure in the chamber involves applying a greater pressure to the lower membrane than to the upper membrane, creating a pressure differential between about 1 psi and about 100 psi.

20. The method of claim 18, wherein controlling pressure in the chamber results in an S-shaped deformation of the heated composite material as it conforms around a forming tool.

* * * * *